United States Patent

Schiess

[15] 3,695,384
[45] Oct. 3, 1972

[54] NON-MENISCUS FORMING ORIFICES

[72] Inventor: Marcel C. Schiess, 703 Quincy N.E., Albuquerque, N. Mex. 87110

[22] Filed: Sept. 25, 1970

[21] Appl. No.: 75,384

[52] U.S. Cl..............................181/0.5 R, 343/873
[51] Int. Cl...............................................H01q 1/42
[58] Field of Search.......239/310, 318; 340/34, 38 P, 340/50, 190; 343/720, 872; 181/0.5 R, 0.5

[56] References Cited

UNITED STATES PATENTS 2,948,480   8/1960   Budwig......................239/318

*Primary Examiner*—Benjamin A. Borchelt
*Assistant Examiner*—H. A. Birmiel
*Attorney*—Roland A. Anderson

[57] ABSTRACT

Means for freeing an opening in a base member from blocking fluids which may normally form a meniscus over an opening including a notch in the base member with a wide portion substantially tangent to the sides of said opening and with converging edges from said wide portion. The notch may include a V-shaped groove in the base member having a depth decreasing from said wide portion with converging edges of sharp definition. The notch may be aligned with the converging edges in the direction of forces tending to clear the fluid from the opening.

2 Claims, 4 Drawing Figures

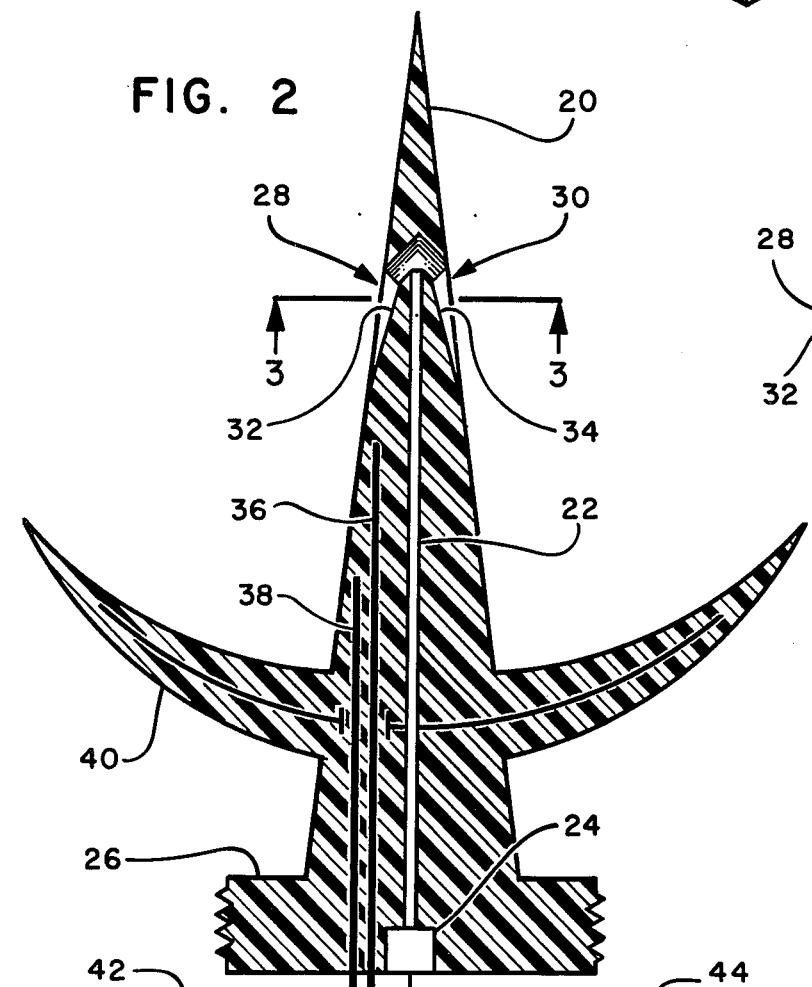

NON-MENISCUS FORMING ORIFICES

BACKGROUND OF INVENTION

Orifices or ports or other similar openings which are used in an environment containing liquids are subject to blocking by the liquid when the opening size is sufficiently small in relation to the surface tension of the liquid. When the opening size is small enough so that the liquid can form a meniscus in the opening, the opening may be blocked or obstructed by the meniscus and prevent passage therethrough of gas or air or of sound waves and the like or otherwise inhibit utilization of the opening.

A particularly difficult liquid to deal with under such circumstances is water because of its high wetting ability and high surface tension. Therefore, applications which utilize orifices in an area which may be subjected to rainfall or to condensation from humidity or the like may be susceptible to such meniscus blocking.

There are various surveillance systems or devices which are used for detecting or monitoring man-associated intrusions (such as personnel or vehicular traffic) within certain controlled areas, for example, in commercial establishments or private residences and security restricted or military areas. Some of these surveillance systems many monitor seismic signals and then attempt to identify and determine whether they are man-associated. It may be very difficult to identify or distinguish man-associated seismic signals from other extraneous disturbances under some circumstances, such as seismic signals generated by wind, rain, thunder and the like. Because of this, it is desirable in many instances that there be some verification of the identification of the seismic signals as man-associated. Such verification may be achieved by incorporating an acoustic sensing device with the seismic surveillance system and the acoustic sensing device energized whenever a suspected man-associated intrusion is detected by the seismic system. Such may thus provide an acoustic verification of the man-associated intrusion.

It will be apparent that such a system may be used under a wide range of atmospheric conditions including areas having rainfall or condensation from dew or the like. Under such atmospheric conditions acoustic ports or orifices or other openings may be blocked during the rainfall or condensation by a water meniscus thereacross and interfere with or prevent the desired verification. It would be desirable that such openings be capable of passage of sound waves or free movement of gases without the addition of hoods, shields, etc., or any other extensive additions to the base member.

Orifices are also used in fluidic systems which may include one or more liquids or gases under low pressure passing the orifice. A meniscus formed across the opening may obstruct or block the free movement of gases therethrough.

SUMMARY OF INVENTION

In view of the above, it is an object of this invention to provide a non-meniscus forming orifice.

It is a further object of this invention to provide an orifice which tends to clear itself of any fluids which may attempt to produce a meniscus thereacross.

Various other objects and advantages will appear from the following description of the invention, and the most novel features will be particularly pointed out hereinafter in connection with the appended claims. It will be understood that various changes in the details and arrangements, which have been herein described and illustrated in order to explain the nature of the invention, may be made by those skilled in the art.

The invention comprises a member having an opening therein with a notch in the member having a wide portion substantially tangent to the side of the opening and converging edges from said wide portion.

DESCRIPTION OF DRAWING

The invention is illustrated in the accompanying drawing wherein:

FIG. 1 is a perspective view of a member including an opening and notch arrangement made in accordance with this invention;

FIG. 2 is a cross-sectional view of an antenna system including non-meniscus orifices together with a schematic diagram of a surveillance system coupled thereto;

FIG. 3 is an expanded cross-sectional view of a portion of the antenna system of FIG. 2; and FIG. 4 is an expanded fragmentary view of a portion of the antenna system of FIG. 2.

DETAILED DESCRIPTION

The member or structure in which the orifice or opening is located and its shape, construction, configuration and the like will depend upon its ultimate use. The member may be flat or include a flat portion, as shown by base or conduit member 10 in FIG. 1, or be curved and of any appropriate thickness or cross section. Assuming that member 10 is a thin sheet and is shown with exaggerated thickness, the non-meniscus forming orifice of this invention may be formed as illustrated in FIG. 1. The opening which is subject to meniscus blocking may be annular of any desired circular or non-circular shape, depending on its use. In base member 10, opening 12 is shown as circular for purpose of illustration. A notch 14 is provided in base member 10 having a wide portion substantially tangent to the sides of orifice 12 and with edges 16 and 18 converging together to a vertex away from the points of tangency. Since base member 10 is assumed to be a thin sheet, notch 14 is shown as a complete cutout through base member 10. If base member 10 has sufficient thickness, notch 14 may be made of varying depths and configurations to provide the desired meniscus freeing action as illustrated with respect to FIGS. 2-4. Notch 14 may have vertical, slanting or curved walls so long as edges 16 and 18 are maintained with sufficiently sharp configuration or definition to insure effective wetting thereof by the fluid being cleared from opening 12. The sharper the edges the greater the wetting action. Such notches or grooves may be appropriately formed in the base member by cutting or machining or by other processes if the converging edges are maintained in the desired sharp configuration.

Any appropriate fluid pressure responsive or similar utilization means, device or system may be coupled to one or both sides of opening 12 to utilize the opening for passage or use of some desired fluid.

The length of edges 16 and 18 is preferably at least as long as the diameter of opening 12 to insure optimum operation of the non-meniscus forming orifice. For applications using a thin sheet base member 10 the length of edges 16 and 18 preferably does not exceed twice the diameter of orifice 12 though such a limitation is less significant than the minimum dimension and may not be applicable to those applications where notch 14 does not go entirely through base member 10.

As a fluid flows over the surface of base member 10, such as water from rainfall, condensation or the like, a meniscus which attempts to form over opening 12 will be pulled by capillary action of notch 14 and wetting action of edges 16 and 18 immediately from opening 12 maintaining opening 12 at least partially open at all times. Thus, the "opening" of opening 12 and notch 14 and the edges 16 and 18 combine to provide a non-meniscus forming orifice. It will be apparent, that such action will only continue while the volume of fluid is below that which would submerge the entire orifice and notch.

This meniscus self-clearing action may be enhanced by aligning notch 14 with the vertex thereof in the direction of some force which also may tend to clear the liquid from the orifice. Such forces may include gravity or a flow of air, liquid or gas along member 10. The notch and edge arrangement is capable of overcoming to a certain extent such forces so that, if the application requires it, the notch may be aligned in other directions and still obtain some meniscus clearing action, even with the notch directed in the opposite direction to the forces.

Where the liquid to be cleared is water in air, the non-meniscus orifice inhibits formation of a water meniscus with opening diameters of from about 0.25 down to 0.08 inch. Above 0.25 inch diameter the formation of a water meniscus is generally not a problem while below 0.08 inch diameter the forces of adhesion and surface tension may be too great in many applications to be upset or overcome by variation in orifice shape with degree of reliability.

In the embodiment shown in FIG. 2, the conduit member or structure is an electrically insulative, electromagnetic wave transparent, antenna housing 20 having a generally annular, conical configuration. Antenna housing 20 includes an acoustic channel, passageway or duct 22 passing longitudinally therethrough from a microphone or other sound or fluid pressure responsive transducer 24 in the base 26 of the housing to one or more transverse openings 28 and 30 which communicate between duct 22 and the exterior of housing 20. Openings 28 and 30 may be of any appropriate circular or non-circular shape and of any convenient opening orientation. The openings 28 and 30 include a notch and edge arrangement similar to that described with respect to FIG. 1 but with a V-shaped groove configuration 32 and 34, which is shown in greater particularity in FIGS. 3 and 4. The edges of the V-shaped grooves 32 and 34 converge from the wide portion, tangent to openings 28 and 30, to a vertex. As shown in FIG. 4, the opening and V-shaped notch and groove cooperate to provide the non-meniscus forming orifice. Antenna housing 20 may be arranged in many applications in a generally vertical position with grooves 32 and 34 downwardly disposed so as to be aligned with liquid flow caused by gravity.

Antenna housing 20 may also include therein appropriate receiving and transmitting radio antennas 36 and 38 and radiation reflectors or ground plane elements 40 to provide contact with some appropriate remotely located monitoring station. These antennas may be coupled to a suitable seismic surveillance system 42 or other utilization means which monitors seismic signals in the vicinity of system 42. Should seismic surveillance system 42 detect seismic signals which may be man-associated, the remote monitoring station may be informed of such through transmitting antenna 38. If the monitoring station agrees, it may activate an appropriate acoustic verification system 44 through receiving antenna 36. Acoustic verification system 44, which is coupled to the microphone or other appropriate sound transducer 24, may receive acoustic signals passing through openings 28 and 30 and duct 22 and by suitable filters, receivers, audio amplifiers and the like may transmit radio signals via transmitting antenna 38 to the monitoring station which are representative of any acoustic signals or sound waves picked up by openings 28 or 30 and sensed by microphone 24.

During this operation, rain or condensation which may be formed on antenna housing 20 will be quickly cleared from openings 28 and 30 by the non-meniscus forming orifice arrangement. Such orifices have maintained openings 28 and 30 clear even in rainfalls of 3 inches per hour or more without obstructing the passage of sound waves to microphone 24. Without the non-meniscus forming orifice, such rainfalls rapidly blocked or interfered with passage of sound waves and continued such blockage throughout the rain. This self-clearing action of fluid from the opening was achieved without additional fluid shielding of the openings.

What is claimed is:

1. Apparatus comprising acoustic pressure responsive means, an antenna housing member having an acoustical duct therein in communication with said acoustic pressure responsive means, said antenna housing member having a wall portion with a passageway therein communicating with said acoustical duct and including an orifice exposed to the exterior of said housing and a notch with a wide portion substantially tangent to the sides of said orifice and with edges converging from said wide portion and in general alignment with normal direction of liquid flow along said antenna housing member.

2. The apparatus of claim 1 wherein each of the converging edges of said notch is of length greater than diameter of said orifice.

* * * * *